(12) United States Patent
Sancheti et al.

(10) Patent No.: US 8,074,086 B1
(45) Date of Patent: Dec. 6, 2011

(54) CIRCUIT AND METHOD FOR DYNAMIC IN-RUSH CURRENT CONTROL IN A POWER MANAGEMENT CIRCUIT

(75) Inventors: Sanjay Kumar Sancheti, Sunnyvale, CA (US); Anup Nayak, Fremont, CA (US); Bo Gao, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 805 days.

(21) Appl. No.: 11/953,176

(22) Filed: Dec. 10, 2007

Related U.S. Application Data

(60) Provisional application No. 60/874,531, filed on Dec. 11, 2006.

(51) Int. Cl.
*G06F 1/26* (2006.01)
(52) U.S. Cl. ......... 713/300; 713/310; 713/320; 713/330
(58) Field of Classification Search ................. 713/300, 713/310, 320, 330
See application file for complete search history.

(56) References Cited

U.S. PATENT DOCUMENTS

| | | | | |
|---|---|---|---|---|
| 4,150,309 A | * | 4/1979 | Tokuda | 327/513 |
| 4,658,676 A | * | 4/1987 | Furusawa et al. | 477/125 |
| 5,251,320 A | * | 10/1993 | Kuzawinski et al. | 713/324 |
| 5,585,752 A | * | 12/1996 | Botti et al. | 327/131 |
| 6,183,122 B1 | * | 2/2001 | De Angel | 708/631 |
| 6,259,804 B1 | * | 7/2001 | Setlak et al. | 382/124 |
| 6,966,006 B2 | * | 11/2005 | Pacheco et al. | 713/300 |
| 7,414,335 B2 | * | 8/2008 | Hussein et al. | 307/135 |
| 7,589,584 B1 | * | 9/2009 | Bui | 327/538 |
| 7,723,867 B2 | * | 5/2010 | Willingham et al. | 307/80 |
| 2003/0005340 A1 | * | 1/2003 | Ku | 713/300 |
| 2005/0083761 A1 | * | 4/2005 | Ginosar | 365/222 |
| 2005/0091629 A1 | * | 4/2005 | Eisenstadt et al. | 716/13 |
| 2006/0261855 A1 | * | 11/2006 | Hillman et al. | 326/101 |
| 2007/0016313 A1 | * | 1/2007 | Abe et al. | 700/22 |
| 2007/0152646 A1 | * | 7/2007 | Godil | 323/282 |
| 2008/0297063 A1 | * | 12/2008 | Willingham et al. | 315/226 |
| 2009/0024856 A1 | * | 1/2009 | Lee | 713/320 |
| 2009/0160253 A1 | * | 6/2009 | Rao et al. | 307/38 |

\* cited by examiner

*Primary Examiner* — Vincent Tran
*Assistant Examiner* — Zahid Choudhury

(57) ABSTRACT

Disclosed are a circuit and a method for controlling dynamic in-rush current in a power management circuit. The circuit includes a current limiting unit having a first quantity of sleep mode devices. A voltage drop minimization unit is coupled to the current limiting unit and has a second quantity of sleep mode devices. The second quantity of sleep mode devices is greater than the first quantity of sleep mode devices. A sequential enabling unit is coupled to both the current limiting unit and the voltage drop minimization unit. The sequential enabling unit is configured to turn on the voltage drop minimization unit after the current limiting unit in accordance with a predetermined delay.

18 Claims, 5 Drawing Sheets

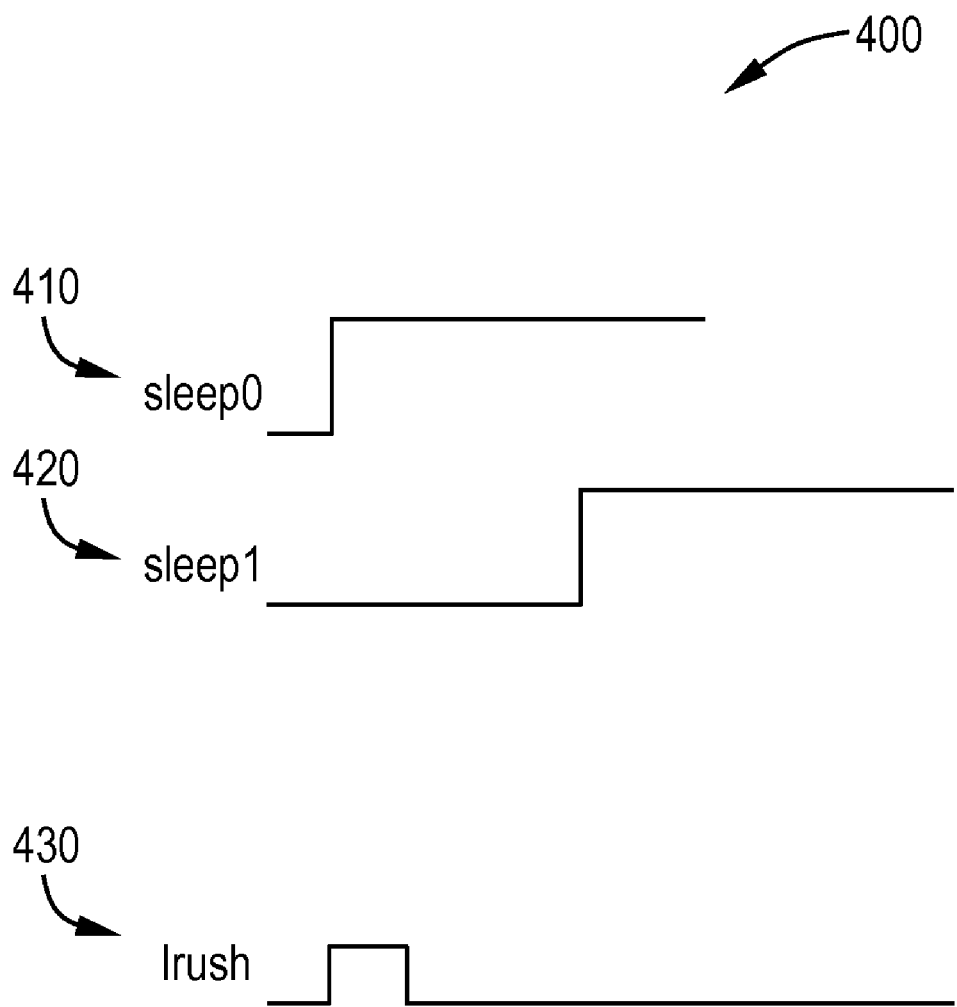

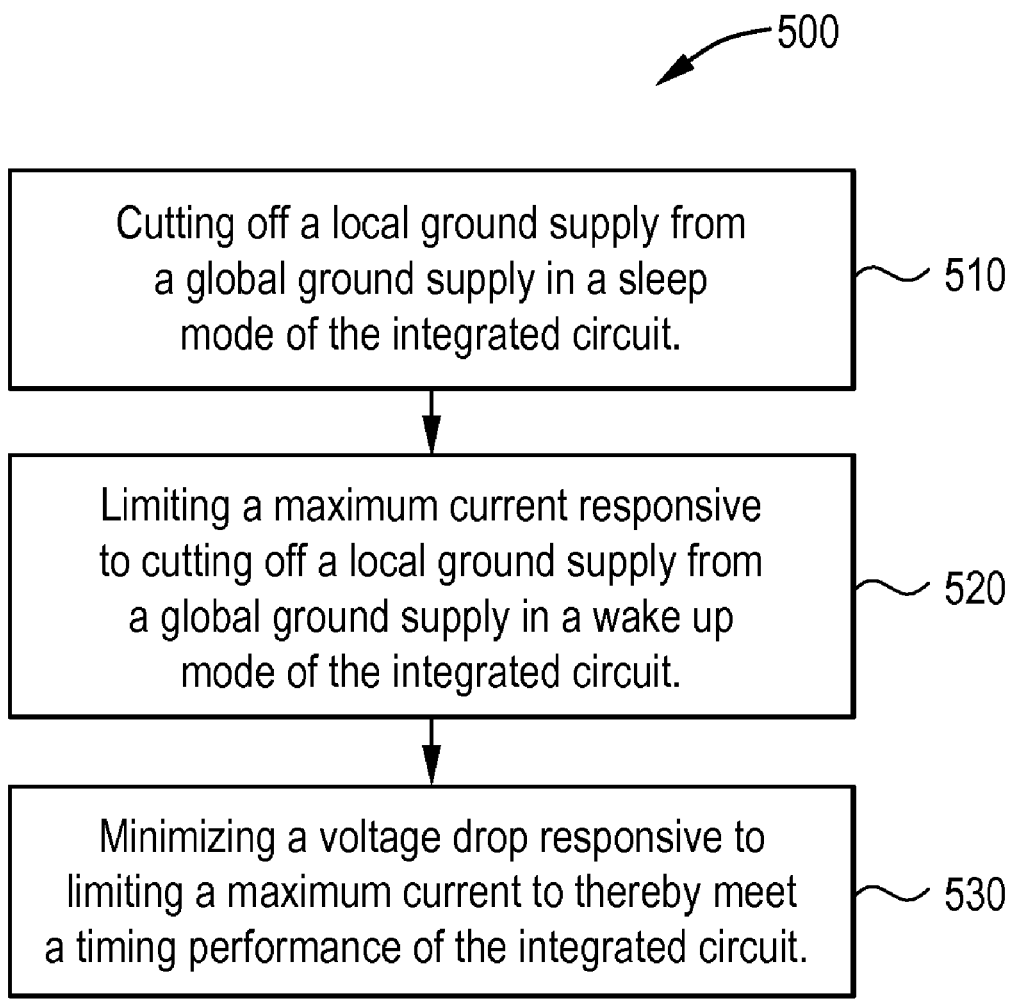

CIRCUIT AND METHOD FOR DYNAMIC IN-RUSH CURRENT CONTROL IN A POWER MANAGEMENT CIRCUIT

This application claims priority under 35 U.S.C. §119(e) to U.S. Provisional Application No. 60/874,531, filed on Dec. 11, 2006, the entire contents of which are hereby incorporated by reference herein.

BACKGROUND

1. Field of the Invention

The present invention relates to power management circuits. More particularly, the present invention relates to a circuit and method for dynamic in-rush current control in a power management circuit.

2. Background Information

Conventional computing systems (including, but not limited, to personal computers, cellular phones, personal digital assistants, media players, digital cameras, and the like) include power control features. Power control features are used to reduce dynamic and static power consumption of a system to increase the battery life and to reduce energy consumption of the system. Such functionality is particularly valuable in mobile devices. Dynamic power is consumed by all components of a system during state switching of internal electronic circuits (while the device is in active operation), whereas static power is consumed due to the leakage currents of electronic devices when no switching is occurring.

In a conventional low-power memory device, sleep (power minimization) transistors are used to cut off power supplies to logic blocks of the memory device when the device is operating in standby mode. In such an approach, sleep transistors are used between a global supply rail (e.g., grounded supply in case of N-channel sleep transistors) and a local power supply rail of a logic block or circuit block of the memory device. During a sleep mode of the memory device, the sleep transistor is turned off, which helps in minimizing leakage current between supply rails. During the sleep mode, a portion of the memory device remains powered on. During a wake up event (also referred to as wake up mode), when the chip transitions from sleep mode to an active mode, a large in-rush current could result from internal nodes transitioning through non-rail voltages. Such a situation is a disadvantage of conventional sleep transistor controlled power management circuits.

Referring to FIG. 1, a conventional power management circuit 100 for an Integrated Circuit (IC)/memory device is illustrated. The power management circuit 100 comprises a plurality of N-channel Metal Oxide Semiconductor (NMOS) transistors configured as sleep mode transistors 110. Control inputs of the sleep mode transistors 110 are connected in a daisy chain configuration (i.e., the control input of each sleep mode transistor 110 is coupled in series with the control input of a previous sleep mode transistor 110). A delay unit 120 is coupled between each pair of sleep mode transistors 110 (i.e., coupled to the control input of each transistor) to enable a staggered turn-on of the sleep mode transistors 110. A control signal wake up is applied to a control terminal of a first transistor 110 of the plurality of sleep mode transistors 110. The power management circuit 100 is coupled to a global ground supply vgnd and a local ground supply vgnd_virt.

Referring to FIG. 2, a waveform 200 illustrates a transition from a sleep event to a wake up event in a conventional memory device. In a first step, during a wake up event, a sleep signal transitions from logic 0 to logic 1. In a second step, an in-rush current $I_{rush}$ is generated, because internal nodes of the memory device transition through non-supply rail voltages. Both the first and second steps refer to operational modes of the power management circuit 100.

A disadvantage of the conventional power management circuit 100 is that the daisy chaining of the control inputs requires a single control signal wakeup to traverse large areas of the memory device. Such a situation further requires buffering (i.e., coupling of delay units with transistors) that leads to large leakage current through the buffers (i.e., dynamic in-rush current). Thus, timing becomes complicated in terms of determining when the daisy chain gets completely powered on and off. Moreover, the conventional power management circuit 100 consumes more area.

It is therefore desirable to provide a power management circuit that controls in-rush current during transition from sleep mode to wake up mode of the memory device. The power management circuit should further prevent any disturbance in the memory data.

SUMMARY OF THE INVENTION

A circuit and method are disclosed for dynamic in-rush current control in a power management circuit. In accordance with exemplary embodiments of the present invention, according to a first aspect of the present invention, a circuit includes a current limiting unit having a first quantity of sleep mode devices. The circuit includes a voltage drop minimization unit coupled to the current limiting unit and having a second quantity of sleep mode devices. The second quantity of sleep mode devices in the voltage drop minimization unit is greater than first quantity of sleep mode devices in the current limiting unit. The circuit includes a sequential enabling unit coupled to both the current limiting unit and the voltage drop minimization unit. The sequential enabling unit is configured to turn on the voltage drop minimization unit after the current limiting unit in accordance with a predetermined delay.

According to the first aspect, the sleep mode devices of each of the current limiting unit and the voltage drop minimization unit can comprise sleep mode transistors or other like devices or components. For example, the sleep mode transistors of the current limiting unit can comprise a plurality of weak turn-on transistors, and the sleep mode transistors of the voltage drop minimization unit comprise a plurality of strong turn-on transistors. The sequential enabling unit can comprise a sequential circuit generating a plurality of non-overlapping sleep control signals. The circuit can include a delay generator coupled between the current limiting unit and the voltage drop minimization unit that is configured or otherwise adapted to generate the delay.

According to a second aspect of the present invention, a device includes a current limiting circuit comprising a first group of sleep components. The device includes a voltage drop minimization circuit coupled to the current limiting circuit and comprising a second group of sleep components. The second group comprises a quantity of sleep components that is greater than the first group. The device also includes a control circuit generating a plurality of non-overlapping control signals for both the current limiting circuit and the voltage drop minimization circuit. The control circuit is configured to turn on the voltage drop minimization circuit after the current limiting circuit in accordance with a predetermined delay.

According to the second aspect, the sleep components of each of the current limiting circuit and the voltage drop minimization circuit can comprise sleep mode transistors or other like devices or components. According to an exemplary embodiment of the second aspect, the second group of sleep mode transistors can comprise about 98% of the total number of sleep mode transistors in the device, and the first group of sleep mode transistors can comprise about 2% of the total number of sleep mode transistors. The plurality of non-overlapping control signals can comprise at least two non-overlapping sleep mode control signals.

According to a third aspect of the present invention, a power management device includes a plurality of current limiting units. The device includes a plurality of voltage drop minimization units. Each voltage drop minimization unit is coupled to a current limiting unit. The sleep component density of each voltage drop minimization unit is larger than the sleep component density of each corresponding current limiting unit. The device also includes a control unit generating a plurality of non-overlapping control signals for both the plurality of current limiting units and the plurality of voltage drop minimization units. The control unit is configured to turn on each voltage drop minimization circuit after each corresponding current limiting circuit in accordance with a predetermined delay.

According to the third aspect, each of the plurality of current limiting units and the plurality of voltage drop minimization units can comprise a plurality of sleep mode transistors. For example, the plurality of sleep mode transistors in each of the voltage drop minimization units can comprise about 98% of the total number of sleep mode transistors in the device, and the plurality of sleep mode transistors in each of the current limiting units can comprise about 2% of the total number of sleep mode transistors.

According to a fourth aspect of the present invention, a method of managing power in an integrated circuit comprises the steps of: cutting off a local ground supply from a global ground supply in a sleep mode of the integrated circuit; limiting a maximum current responsive to cutting off a local ground supply from a global ground supply in a wake up mode of the integrated circuit; and minimizing a voltage drop responsive to limiting a maximum current to thereby meet a timing performance of the integrated circuit. The step of minimizing a voltage drop follows the step of limiting a maximum current after a predetermined turn on delay.

According to the fourth aspect, the step of cutting off a local ground supply from a global ground supply can comprise the steps of: turning off a plurality of sleep mode transistors; and minimizing leakage current between supply rails of the integrated circuit. The step of limiting a maximum current can comprise the step of turning on a first plurality of sleep mode transistors to limit a maximum current in accordance with a current specification value of the integrated circuit. The step of minimizing a voltage drop can comprise the steps of: discharging a node of supply voltage; and turning on a second plurality of sleep mode transistors. The turn on delay can be programmable. For example, the turn on delay can comprise a count of a number of cycles in a plurality of sleep control signals. The method can include the step of retaining a power on state of both a current limiting circuit and a voltage drop minimization circuit while local ground supply is cut off from a global ground supply. According to an exemplary embodiment of the fourth aspect, the current limiting circuit can comprise a first quantity of sleep mode transistors. The voltage drop minimization circuit can comprise a second quantity of sleep mode transistors. The second quantity of sleep mode transistors in the voltage drop minimization unit can be greater than first quantity of sleep mode transistors in the current limiting unit.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 4 illustrates a transition from a sleep event to a wake up event in a memory device controlled by an improved power management circuit, in accordance with an exemplary embodiment of the present invention.

FIG. 5 illustrates a method for minimizing in-rush current in a power management circuit, in accordance with an exemplary embodiment of the present invention.

DETAILED DESCRIPTION OF THE PREFERRED EMBODIMENTS

Figure 1:
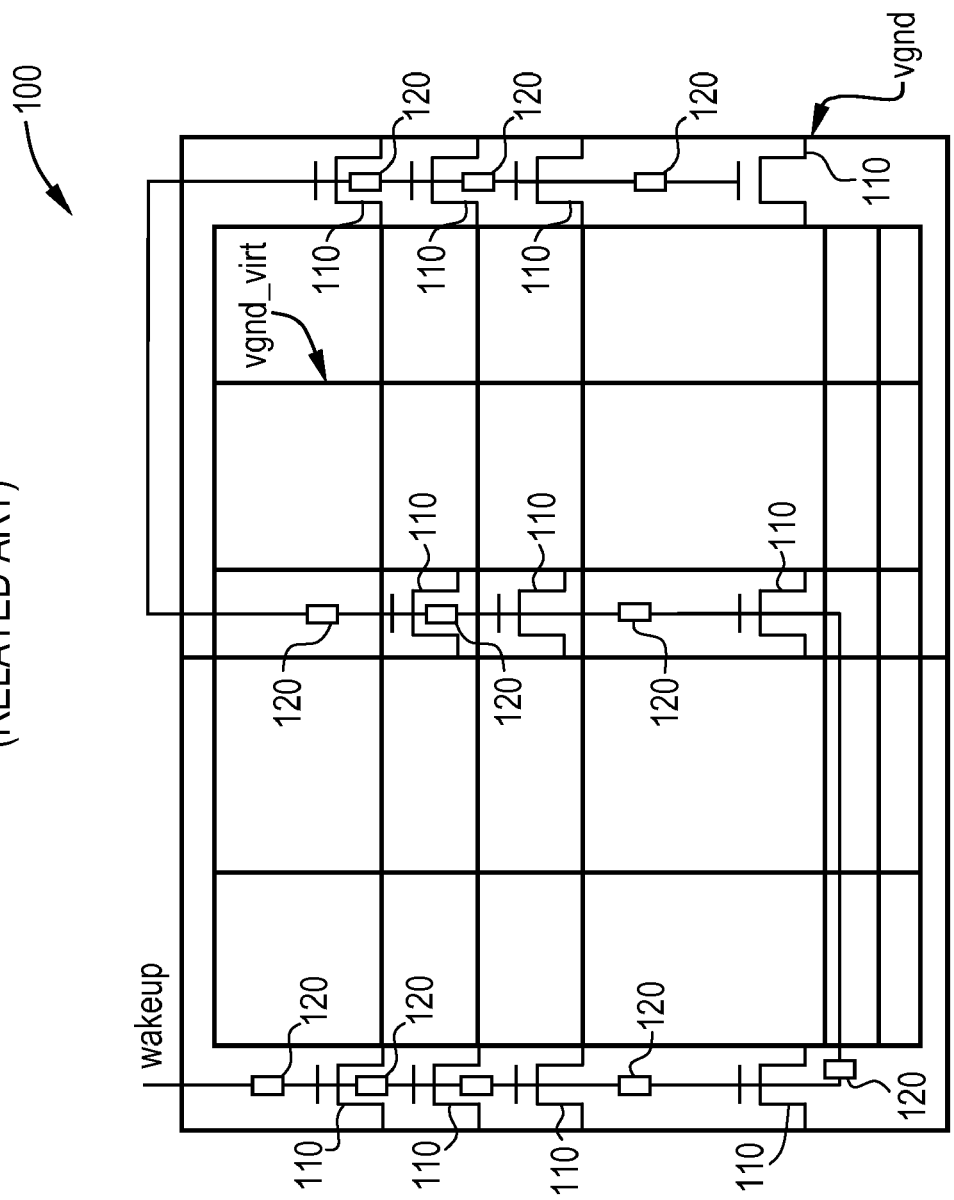
FIG. 1 illustrates a conventional power management circuit.
Figure 2:
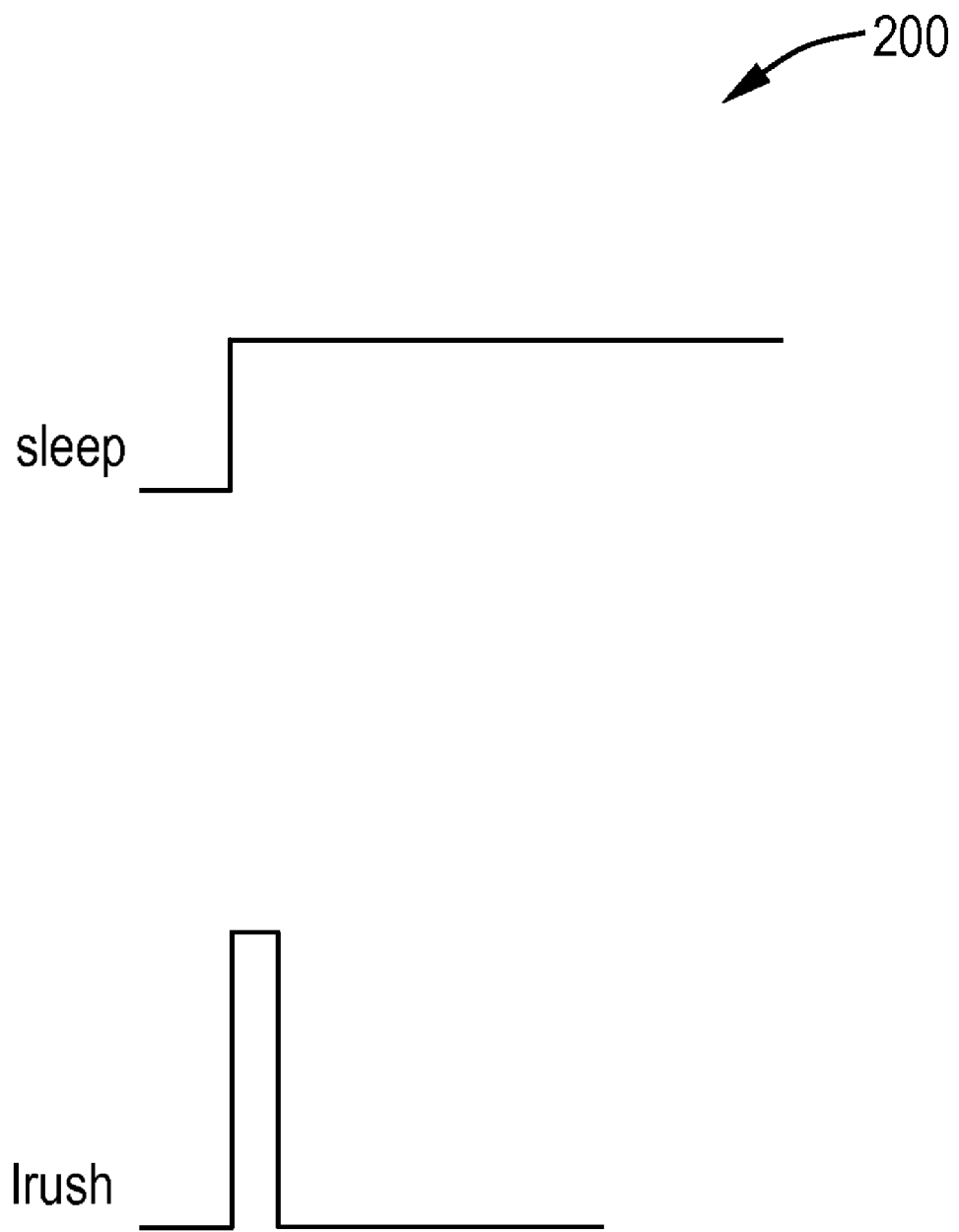
FIG. 2 illustrates a transition from a sleep event to a wake up event in a conventional memory device.

Exemplary embodiments of the present invention are directed to a circuit and method for dynamic in-rush current control while a memory or other low-power device transits from a sleep mode to a wake up mode. In an exemplary embodiment of the present invention, a power management device includes an in-rush current control feature. The power management device includes a current limiting unit. A voltage drop minimization unit is coupled to the current limiting unit. The number of components in the voltage drop minimization unit is larger than number of components in the current limiting unit. The device also includes a control unit that generates a plurality of non-overlapping control signals for both the current limiting unit and the voltage drop minimization unit. The plurality of non-overlapping signals can include at least two non-overlapping sleep mode control signals. Each of the current limiting unit and the voltage drop minimization unit includes a plurality of sleep mode transistors. According to exemplary embodiments, when the memory or other low-power device wakes up, the current limiting unit (having the lesser quantity of sleep mode transistors) is turned on first to limit the maximum current to the chip to ensure the integrity of the power network. After the virtual power or ground net is discharged, the voltage drop minimization unit (having the greater quantity of steep mode transistors) is turned on so that during normal active mode the voltage drop across the sleep mode transistors is minimized to meet timing performance.

In an exemplary embodiment of the present invention, the plurality of sleep mode transistors comprises a plurality of N-channel Metal Oxide Semiconductor (NMOS) transistors or the like. In an alternative embodiment, the plurality of sleep mode transistors comprises a plurality of P-channel Metal Oxide Semiconductor (PMOS) transistors or the like. According to an exemplary embodiment, the ratio of the number of components in the voltage drop minimization unit (the number of sleep mode transistors) to the number of components in the current limiting unit (the number of sleep mode transistors) is, for example, about 98% to about 2%, although any suitable ratio can be used. In an alternative exemplary embodiment of the present invention, both a plurality of current limiting units and a plurality of timing synchronization units are configured to control an in-rush current. The plurality of sleep mode transistors is not restricted to two groups, and, therefore, can be distributed into more than two groups. The distribution of sleep mode transistors into groups depends upon, for example, the intensity of in-rush current to be controlled in the memory device.

In another embodiment of the invention, the power management device comprises a plurality of current limiting units. Each of a plurality of voltage drop minimization units is coupled to each current limiting unit. A component density of the voltage drop minimization unit is larger than a component density of the current limiting unit. The device also comprises a control unit, which generates a plurality of non-overlapping control signals for both the plurality of current limiting units and the plurality of voltage drop minimization units. Accordingly, noise can be controlled on internal power supplies that are shared by logic flip flops and the memory device. Thus, register configuration and memory data is not disturbed.

Figure 3:
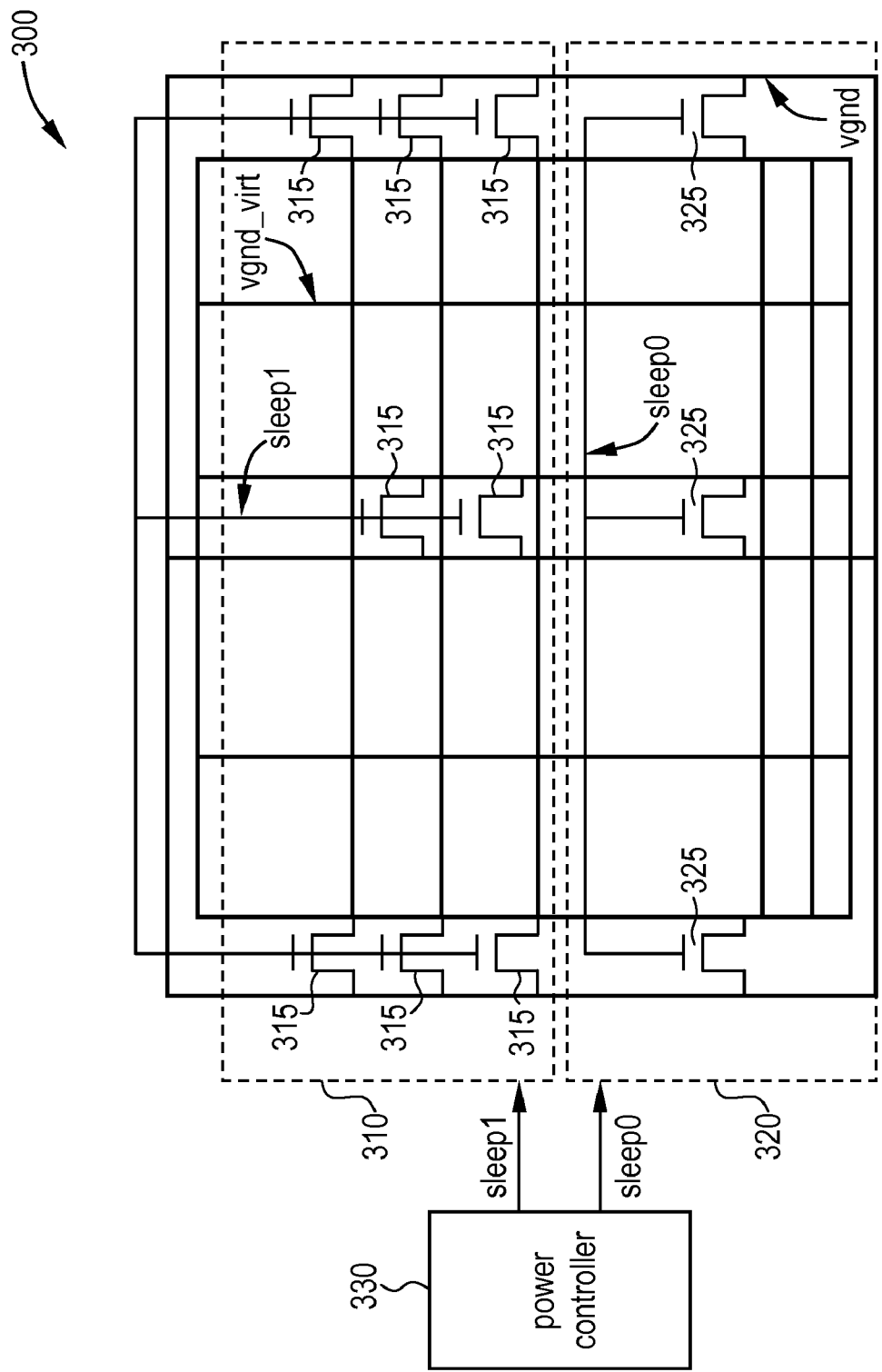
FIG. 3 illustrates a power management circuit comprising dynamic in-rush current control, in accordance with an exemplary embodiment of the present invention.

These and other aspects and embodiments of the present invention will now be described in greater detail. FIG. 3 illustrates a power management circuit 300 comprising dynamic in-rush current control, in accordance with an exemplary embodiment of the present invention. The circuit 300 comprises a current limiting unit 320. A voltage drop minimization unit 310 is coupled to the current limiting unit 320. According to an exemplary embodiment of the present invention, the number of components in the voltage drop minimization unit 310 is larger than the number of components in the current limiting unit 320. A sequential enabling unit 330 (power controller) is coupled to a control terminal (through non-overlapping control signals sleep0 and sleep1) of both the current limiting unit 320 and the voltage drop minimization unit 310. For example, the ratio of the number of components in the voltage drop minimization unit 310 to the number of components in the current limiting unit 320 can be at least about 2 to 1, and more preferably about 98% to about 2%. However, any suitable ratio can be used such that the number of components in the voltage drop minimization unit 310 is larger than the number of components in the current limiting unit 320. In an exemplary embodiment of the present invention, both the plurality of current limiting units 320 and the plurality of voltage drop minimization units 310 are configured to control the in-rush current in the manner described below.

Each of the current limiting unit 320 and the voltage drop minimization unit 310 comprises a plurality of sleep mode transistors 325 and 315. In an exemplary embodiment, each of the plurality of sleep mode transistors 325 and 315 can comprise a plurality of N-channel Metal Oxide Semiconductor (NMOS) transistors coupled together at their gate terminals. In an alternative embodiment, the plurality of sleep mode transistors 325 and 315 can comprise a plurality of P-channel Metal Oxide Semiconductor (PMOS) transistors. However, any suitable type of transistors or other like devices or components can be used for the sleep mode transistors 325 and 315. The power management circuit 300 is coupled to a global ground supply $V_{gnd}$ and a local ground supply $V_{gnd\_virt}$.

According to exemplary embodiments, when the memory or other low-power chip or device wakes up, the current limiting unit 320 (having the lesser quantity of sleep mode transistors 325) is turned on first to limit the maximum current to the device (e.g., in accordance with the device's active current specifications) to ensure the integrity of the power network. After the virtual power or ground net is discharged, the voltage drop minimization unit 310 (having the greater quantity of sleep mode transistors 315) is turned on so that during normal active mode the voltage drop across the sleep mode transistors 325 and 315 is minimized to meet timing performance or other like characteristics. The non-overlapping characteristics of both the signals sleep0 and sleep1 causes a component turn on delay between the current limiting unit 320 and the voltage drop minimization unit 310. In an exemplary embodiment, the power management circuit 300 comprises a delay generator circuit, device, or unit coupled between the current limiting unit 320 and the voltage drop minimization units 310 for generating the component turn on delay. According to an alternative exemplary embodiment, the delay generator unit can be integral to or otherwise form a component of the sequential enabling unit 330. Such a delay generator unit can be configured or otherwise adapted to count a predetermined number of cycles before the sleep mode transistors 315 of the voltage drop minimization unit 310 are turned on. In accordance with an exemplary embodiment of the invention, the delay generator circuit comprises a counter circuit or the like. For example, the counter unit can be programmable depending on the requirements of the particular implementation. The length of the delay between when the current limiting unit 320 and voltage drop minimization unit 310 are turned on will depend on various factors, including, but not limited to, the operating characteristics and power requirements of the device or chip.

FIG. 4 illustrates a transition from a sleep event to a wake up event in a memory device controlled by an improved power management circuit 300, in accordance with an exemplary embodiment of the present invention. In a first step, during a wake up event, a signal 410 (sleep0) transitions from logic 0 level to logic 1 level. In a second step, the sleep mode transistors 325 of the current limiting unit 320 turn on and a maximum current is restricted to the memory device's active current specifications, designated by signal 430 ($I_{rush}$). After a suitable predetermined delay, in a third step, a signal 420 (sleep1) transitions from logic 0 to logic 1. In a fourth step, the sleep mode transistors 315 of the voltage drop minimization unit 310 are turned on to minimize the voltage drop across the transistors. The group of sleep mode transistors 325 operating as a current limiting unit 320 is distinct from the sleep mode transistors 315 of the voltage drop minimization unit 310 with respect to delayed control (non-overlapping signals sleep0 and sleep1) and a transistor density parameter. By turning on a small group of sleep mode transistors 325 (e.g., in current limiting unit 320) first and then delaying before the larger group of sleep mode transistors 315 is turned on (e.g., in voltage drop minimization unit 310), there is a significant reduction in the in-rush current $I_{rush}$. In an alternative exemplary embodiment of the present invention, more than one current limiting group and more than one voltage drop minimization unit can be used. Accordingly, the sleep mode transistors can be divided into more than two groups.

Referring to FIG. 5, a flow chart 500 illustrates a method for minimizing in-rush current in a power management circuit, in accordance with an exemplary embodiment of the present invention. A first step 510 comprises cutting off a local ground supply from a global ground supply in a sleep mode of an integrated circuit. A second step 520 comprises limiting a maximum current responsive to cutting off a local ground supply from a global ground supply in a wake up mode of the integrated circuit. A third step 530 comprises minimizing a voltage drop responsive to limiting a maximum current to thereby meet a timing performance of the integrated circuit.

The step 510 of cutting off a local ground supply from a global ground supply comprise turning off a plurality of sleep mode transistors and minimizing leakage current between supply rails of the integrated circuit. The step 520 of limiting a maximum current comprises turning on a first plurality of sleep mode transistors to limit a maximum current variable to a current specification value of the integrated circuit. The step 530 of minimizing a voltage drop comprises discharging a node of supply voltage and turning on a second plurality of sleep mode transistors. The node to be discharged is vpwr_virt or vgnd_virt depending upon whether a power supply node gated or a grounded node is gated respectively. There is a turn on delay between the step 520 of limiting a maximum current and the step 530 of minimizing a voltage drop. The turn on delay is implemented using a programmable counter circuit in an exemplary embodiment of the invention.

According to an exemplary embodiment, the method for minimizing in-rush current in a power management circuit comprises retaining a power on state of both a current limiting circuit and a voltage drop minimization circuit while local ground supply is cut off from a global ground supply.

Advantages of the improved power management circuit of the present invention include minimization of complex timing simulations. In addition, delay elements are minimized. Moreover, the circuit is easily integrated into auto place and route floor plan. A delay between the turn-on of transistor groups is controlled for the ease of achieving timing closure in the circuit. Exemplary embodiments of the present invention further control noise on internal power and ground bus for ensuring data integrity of always on (i.e., remains powered on during sleep mode of the memory device) sleep mode transistor blocks. The power management circuit of the present invention limits the maximum current and hence maintains supply bus integrity.

In an alternative exemplary embodiment, the sleep mode transistors of the improved power management circuit comprises PMOS transistors instead of NMOS transistors.

In an exemplary embodiment of the invention, the sleep mode transistors are separated in two groups. A first group has a very small fraction of the total sleep mode transistors. A second group comprises the remaining sleep mode transistors. In an embodiment of the present invention, n-channel sleep mode transistors are used to cut off the local ground supply from the global ground supply. The first group includes, for example, 2% of the total W (quantity of the sleep mode transistors) and the second has the remainder of the total, for example, 98% W. When the memory or other low-power device enters a wake up mode, the 2% group is turned on first to limit the maximum current to the memory chip Icc specification to guarantee the integrity of the power network. After the virtual power or ground net is discharged, the 98% group is turned on so that during normal active mode the voltage (IR) drop across the sleep mode transistor is minimized to meet timing performance. The delay between the two stages can be implemented using a counter or other suitable delay generator or component that is configured to count a predetermined or certain number of cycles that is also programmable depending on the requirements of the memory or other low-power chip.

Exemplary embodiments of the present invention can be used in conjunction with any suitable type of integrated circuit, such as memory or other low-power devices, to control noise on the internal power supplies so that register configuration and memory date are not disturbed, particularly during device wake up.

Embodiments of the present invention are well suited to performing various other steps or variations of the steps recited herein, and in a sequence other than that depicted and/or described herein. In one embodiment, such a process can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a computer-readable medium can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Details of the improved dynamic in-rush current control circuit and the methods of designing and manufacturing the same that are widely known and not relevant to the present discussion have been omitted from the present description for purposes of clarity and brevity.

It should be appreciated that reference throughout the present specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more exemplary embodiments of the present invention.

Similarly, it should be appreciated that in the foregoing discussion of exemplary embodiments of the invention, various features of the present invention are sometimes grouped together in a single embodiment, figure, or description thereof for the purpose of streamlining the disclosure to aid in the understanding of one or more of the various inventive aspects. Such a method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A circuit comprising:
   a first plurality of transistors; and
   a second plurality of transistors,
   the first plurality of transistors configured to couple a voltage source to a memory device responsive to a first control signal, the plurality of transistors configured to allow the memory device to draw no more than a specified maximum current while the memory device transitions from operating in a sleep mode to operating in an active mode, and
   the second plurality of transistors configured to couple the voltage source to the memory device responsive to a second control signal, the second plurality of transistors configured to minimize a voltage drop across the first plurality of transistors and the second plurality of transistors while the memory device is operating in the active mode,
a delay generator configured to generate a delay between the first control signal and the second control signal.

2. The circuit of claim 1, wherein the first plurality of transistors comprise a plurality of weak turn-on transistors, and wherein the second plurality of transistors comprise a plurality of strong turn-on transistors.

3. The circuit of claim 1, wherein the first control signal and the second control signal are non-overlapping control signals.

4. A device, comprising:
a current limiting circuit comprising a first group of sleep components, the first group of sleep components configured to couple a voltage supply rail with a circuit block when the current limiting circuit is turned on;
a voltage drop minimization circuit coupled to the current limiting circuit and comprising a second group of sleep components, the second group of sleep components configured to couple the voltage supply rail with the circuit block when the voltage drop minimization circuit is turned on, the second group of sleep components comprising a greater quantity of sleep components than the first group of sleep components; and
a control circuit configured to turn on the voltage drop minimization circuit after turning on the current limiting circuit in accordance with a predetermined delay,
wherein the current limiting circuit is configured to allow the circuit block to draw no more than a specified maximum current through the first group of sleep components while the circuit block transitions from operating in a sleep mode to operating in an active mode, and the voltage drop minimization circuit is configured to minimize a voltage drop across the first group of sleep components and the second group of sleep components while the circuit block is operating in the active mode.

5. The device of claim 4, wherein the sleep components of each of the current limiting circuit and the voltage drop minimization circuit comprise sleep mode transistors.

6. The device of claim 5, wherein the second group of sleep mode transistors comprises about 98% of a total number of sleep mode transistors in the device, and wherein the first group of sleep mode transistors comprises about 2% of the total number of sleep mode transistors.

7. The device of claim 4, wherein the control circuit is configured to turn on the current limiting circuit and the voltage drop minimization circuit through at least two non-overlapping sleep mode control signals.

8. A power management device, comprising:
a plurality of current limiting units configured to couple an energy supply with a a plurality of circuit blocks;
a plurality of voltage drop minimization units configured to couple the energy supply with the plurality of circuit blocks, wherein each of the plurality of voltage drop minimization unit is coupled to a corresponding one of the plurality of current limiting units, wherein a sleep component density of each voltage drop minimization unit is larger than a sleep component density of each corresponding current limiting unit; and
a control unit configured to generate a plurality of non-overlapping control signals for both the plurality of current limiting units and the plurality of voltage drop minimization units, wherein the control unit is configured to turn on each voltage drop minimization circuit after turning on each corresponding current limiting circuit in accordance with a predetermined delay,
wherein the plurality of current limiting units are configured to allow each of the plurality of circuit blocks to draw no more than a specified maximum current while each of the plurality of circuit blocks transition from operating in a sleep mode to operating in an active mode, and the plurality of voltage drop minimization units are configured to minimize a voltage drop between the energy supply and each of the plurality of circuit blocks while each of the plurality of circuit blocks are operating in the active mode.

9. The device of claim 8, wherein each of the plurality of current limiting units and the plurality of voltage drop minimization units comprises a plurality of sleep mode transistors.

10. The device of claim 9, wherein the plurality of sleep mode transistors in each of the voltage drop minimization units comprises about 98% of a total number of sleep mode transistors in the device, and wherein the plurality of sleep mode transistors in each of the current limiting units comprises about 2% of the total number of sleep mode transistors.

11. A method of managing power in an integrated circuit, the method comprising:
cutting off the integrated circuit from a voltage supply in a sleep mode of the integrated circuit;
coupling the integrated circuit with the voltage supply through a first set of transistors while limiting the integrated circuit to drawing no more than a maximum specified current through the first set of transistors during a wake up mode of the integrated circuit; and
further coupling the integrated circuit with the voltage supply through a second set of transistors to minimize a voltage drop across the first set of transistors and the second set of transistors while meeting a timing performance of the integrated circuit during an active mode of the integrated circuit, wherein the minimizing of the voltage drop follows the limiting of the maximum current by a predetermined turn on delay.

12. The method of claim 11, wherein the cutting off of the integrated circuit from the voltage supply comprises turning off a plurality of sleep mode transistors to minimize leakage current between the voltage supply and the integrated circuit.

13. The method of claim 11, wherein the limiting of the integrated circuit to draw no more than the maximum current comprises turning on a first plurality of sleep mode transistors, wherein the maximum current is in accordance with a current specification value of the integrated circuit.

14. The method of claim 11, wherein the minimizing of the voltage drop comprises: turning on a second plurality of sleep mode transistors.

15. The method of claim 11, wherein the turn on delay is programmable.

16. The method of claim 11, wherein the turn on delay comprises a count of a number of cycles in a plurality of sleep control signals.

17. The method of claim 11, further comprising retaining a power on state of both a current limiting circuit and a voltage drop minimization circuit while the integrated circuit is cut off from the voltage supply.

18. The method of claim 17, wherein the current limiting circuit comprises a first quantity of sleep mode transistors, wherein the voltage drop minimization circuit comprises a second quantity of sleep mode transistors, and wherein the second quantity of sleep mode transistors in the voltage drop minimization circuit is greater than first quantity of sleep mode transistors in the current limiting circuit.

* * * * *